United States Patent
Burris et al.

(10) Patent No.: US 11,881,088 B2
(45) Date of Patent: Jan. 23, 2024

(54) HAND ACTION TRACKING FOR CARD SLOT TAMPERING

(71) Applicant: NCR Corporation, Atlanta, GA (US)

(72) Inventors: Matthew Robert Burris, Lawrenceville, GA (US); Christopher John Costello, Suwanee, GA (US); Gregory Joseph Hartl, Atlanta, GA (US); Caleb Wayne Martinez, Fayetteville, GA (US); Jodessiah Sumpter, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/732,838

(22) Filed: Apr. 29, 2022

(65) Prior Publication Data
US 2023/0252803 A1 Aug. 10, 2023

Related U.S. Application Data

(63) Continuation-in-part of application No. 17/665,021, filed on Feb. 4, 2022, now Pat. No. 11,676,460.

(51) Int. Cl.
| | |
|---|---|
| *G07F 19/00* | (2006.01) |
| *G06V 20/52* | (2022.01) |
| *G06V 40/20* | (2022.01) |
| *G06V 40/10* | (2022.01) |
| *G06V 10/10* | (2022.01) |

(52) U.S. Cl.
CPC ............ *G07F 19/207* (2013.01); *G06V 10/10* (2022.01); *G06V 20/52* (2022.01); *G06V 40/28* (2022.01); *G07F 19/2055* (2013.01)

(58) Field of Classification Search
None
See application file for complete search history.

(56) References Cited

U.S. PATENT DOCUMENTS

| | | | |
|---|---|---|---|
| 11,631,068 B1* | 4/2023 | Krebs | G06V 40/20 705/43 |
| 2009/0201372 A1* | 8/2009 | O'Doherty | G07F 19/20 348/150 |
| 2019/0279468 A1* | 9/2019 | Kishi | G06V 40/172 |
| 2022/0076543 A1* | 3/2022 | Traynor | G07F 19/2055 |

* cited by examiner

*Primary Examiner* — Suezu Ellis
(74) *Attorney, Agent, or Firm* — Schwegman Lundberg & Woessner, P.A.

(57) ABSTRACT

Payment card slot tampering at a transaction terminal is detected in real time. One or more images from one or more cameras are analyzed. The camera(s) is/are focused overhead of the terminal on an area adjacent to and in front of a card slot for a card reader of the terminal. The images are analyzed for determining whether hands of arms for an operator of the terminal are performing actions that indicate the operator may be attempting to install a card skimmer/shimmer into the card slot and/or attempting to remove an existing skimmer/shimmer from the card slot. When card slot tampering event is detected at the terminal a variety of automated actions are processed, such as shutting down the card reader, shutting down the terminal, confiscating any payment card inserted into the card slot, notifying a financial institution, and/or notifying legal authorities.

14 Claims, 3 Drawing Sheets

US 11,881,088 B2

HAND ACTION TRACKING FOR CARD SLOT TAMPERING

RELATED APPLICATIONS

The present application is a Continuation-In Part (CIP) of application Ser. No. 17/665,021 entitled "Currency Trapping Detection," filed Feb. 4, 2022, the disclosure of which is incorporated by reference herein in its entirety.

BACKGROUND

Payment card theft is rampant in the industry. There are generally two types of devices responsible for card data theft, skimmers and shimmers. A skimmer is an attached to card readers to capture and/or transmit magnetic card data when a card is inserted into the card reader. If a user inspects a card reader with a skimmer, there is a decent chance the user will spot the foreign device, such is not the case with a shimmer.

A shimmer is even smaller than a skimmer and is inserted into a chip card reader such that an operator of the terminal cannot see the shimmer because it is very small and sits sufficiently far enough inside the card slot to avoid visual detection. A skimmer overlays chip leads for purposes of capturing the magnetic data on the card (usually replicated within the chip of the card). The stolen magnetic data on the card can then be used to create a fake magnetic card for use in non-chip-based card readers.

Financial institutions (FI) and consumers are victims of card shimmers and skimmers at alarming rates. To thwart this type of fraud there has been many attempts in the industry to modify the card readers themselves to detect a variety of conditions which might indicate a foreign device was inserted into the card slot. For example, voltage signals that deviate from what is expected by a card reader under normal conditions may be able to detect the presence of a shimmer/skimmer.

However, changing hardware is not the preferred method since a single FI may have thousands or tens of thousands of Automated Teller Machines (ATMs— one time of media terminal). It is impractical and expensive to manually swap out card readers on existing terminals. Additionally, once thieves learn how a new card reader detects a skimmer/shimmer, the thieves are usually to device a new shimmer/skimmer that avoids being detected by the new card reader.

SUMMARY

In various embodiments, a system and methods for hand action tracking for card slot tampering are presented.

According to an aspect, a method for hand action tracking for card slot tampering is provided. Images are obtained, the images are captured from at least one camera situated at one or more locations associated with being: overhead of a transaction terminal, adjacent to a card reader module of the transaction terminal, and on the card reader module. The images are analyzed for actions and objects associated with hands of an operator at the terminal relative to a card slot for the card reader module. An alert or a notification is sent when analyzing the images identifies a card slot tampering event.

DETAILED DESCRIPTION

Figure 1:
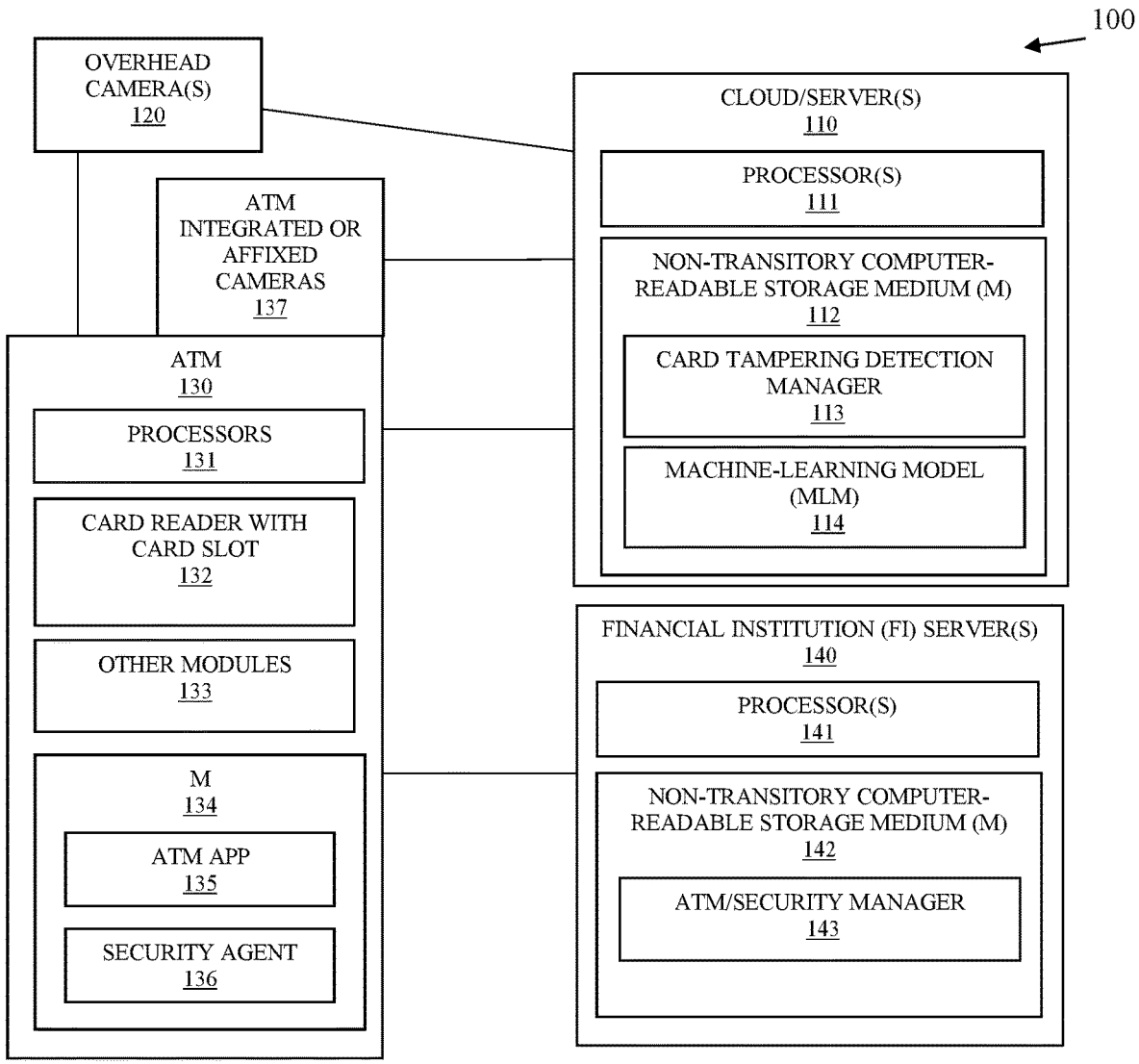
FIG. 1 is a diagram of a system for hand action tracking for card slot tampering, according to an example embodiment.

FIG. 1 is a diagram of a system 100 for hand action tracking for card slot tampering, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of hand action tracking for card slot tampering, presented herein and below.

As used herein and below the terms "cash" and "currency" may be used synonymously and interchangeably. This can be any government-backed note.

As will be demonstrated herein and below, system 100 and the methods that follow permit a low cost and accurate approach to detecting when a card reader module has been tampered with during a transaction by a thief. One or a plurality of different cameras are used to provided images of the card reader slot of the card reader module and hands of individuals adjacent to the cash dispense module during a transaction or even when no official transaction is identified by the terminal.

The images are analyzed, in real time, either by a software module installed on the ATM, software installed on a local server associated with the ATM, or by a remote software module accessible over a remote server (such as a cloud) to determine when card slot tampering is taking place at the ATM. Card reader module can be remotely deactivated for the ATM when card reader slot tampering is detected, and an alert raised indicating that the ATM is in need of service for suspected card reader tampering. Video clips may be captured for a time frame suspected of the card slot tampering and sent with the alert. Moreover, any identifying objects associated with a suspected thief during a suspected card slot tampering event can be isolated and sent to appropriate authorities. Any account card used by a thief to initially activate the card reader slot for installing a tampering device (shimmer and/or skimmer) can be flagged such that the thief's account is locked down.

System 100 includes a cloud/server 110 (optional), an Automated Teller Machine (ATM) 120, zero or more overhead cameras 120, one or more ATM integrated or affixed cameras 137, and ATM 130, and one or more financial institution (FI) servers 140.

Cloud/Server 110 (optional) comprises a processor 111 and a non-transitory computer-readable storage medium 112. Medium 112 comprises executable instructions for a card tampering detection manager 113 and, optionally, a Machine-Learning Model (MLM). The executable instructions when provided or obtained by the processor 111 from medium 112 cause the processor 111 to perform operations discussed herein with respect to 113 and 114.

Overhead cameras 120 (optional) stream image frames captured from above ATM 130. Overhead cameras 120 are not attached or affixed to ATM 130. Overhead cameras 120 stream the images for the image frames directly to a storage location on ATM 130 and/or cloud/server 110.

ATM 130 comprises, a at least one processor 131, a card reader with card slot 132, other modules, and a non-transitory computer-readable storage medium 134. Medium 134 comprises executable instructions for an ATM application (app) 135 and a security agent 136 (optional). The executable instructions when provided or obtained by the processor 131 from medium 134 cause the processor 131 to perform operations discussed herein with respect to 135 and 136.

ATM integrated or affixed cameras 137 stream image frames captured from adjacent to and focused on card reader 132 from one or more exterior side surfaces of the ATM 130 focused on card reader 132. ATM integrated or affixed cameras 137 stream the images for the image frames directly to a storage location on ATM 130 and/or cloud/server 110.

It is noted that cameras 120 and/or 137 may be existing cameras 120 and/or 137 situated overhead of the ATM 120 for security purposes and/or integrated as a peripheral device of the ATM 120. Thus, in some embodiments no additional or new cameras are needed beyond what is already present at the ATM 120 for security monitoring. In some instances, existing cameras 120 and/or 137 can be refocused or reangled from their existing locations for purposes of some of the embodiments that follow.

It is noted in other embodiments, additional new cameras 120 and/or 137 are deployed and positioned (located and focused) for the purposes of some embodiments that follow.

In some embodiments, cameras 120 and/or 137 may be a combination of existing and new cameras 120 and/or 137.

The image frames are processed in a variety of optional or complementary manners either by card tampering detection manager 113 and/or security agent 136. That is, each image processing technique (discussed herein in the various embodiments that follow) does not have to be exclusively performed; rather, each of the embodiments, a combination of the embodiments, or all of the embodiments can be processed individually or in any combination with one another. Furthermore, the image processing techniques may be processed exclusively on ATM 130 by security agent 136, exclusively on cloud/server 110 by card tampering detection manager 113, or by security agent 136 and card tampering detection manager 113 cooperating with one another to perform the image processing technique(s).

Cameras 120 and/or 137 stream the video comprising image frames. A variety of image processing techniques can be processed for purposes of identifying an operator's arms, hands, hand actions (gestures and/or movements), known objects in the hands, and unknown objects in the hands relative to card reader with card slot 132 (herein after just card slot 132).

In one approach, card tampering detection manager 113 utilizes a plurality of deep machine/learning models (MLMs) 114 for purposes of placing a bounding box within the image frames around an operator's arms and hands at ATM 130. The image frames are then further passed to another MLM for purposes of identifying any known object (such as a payment card) or unknown object (such as a tool or other device, which could be a skimmer or a shimmer). Each of the bounding boxes returned by the first MLM 114 comprises an identifiers for arms and hands and coordinates within the image frames for the corresponding bounding boxes. Second MLM 114 takes the bounding box coordinates and the arm and hand identifiers as input and returns as output additional identifiers for known objects (card and/or wallet) and an unknown identifier for any unknown object present in the hands if detected by second MLM 114.

Card tampering detection manager 113 receives the output from the MLMs 114 and may further evaluate the image frames for purposes of determining a distance between the hands and the card slot 132 using the known angles, locations, and field-of-views of each of the cameras 120 and/or 137. Card tampering detection manager 113 may also calculate an elapsed time that each hand was within a predefined distance from the card slot 132 (using timestamps in the image frames). Card tampering detection manager 113 may also obtain any transaction events raised by ATM app 135 and/or provided by security agent 136; for example, no transaction was initiated on ATM 130, a deposit, a balance inquiry, or withdrawal transaction is in progress, etc.

Card tampering detection manager 113 may utilizes the identifiers for the arms, hands, known objects, and unknown objects along with the calculated distances, the calculated elapsed times, and the transaction events and evaluate predefined rules to generate a tampering score. When the tampering score is above a threshold, card tampering detection manager 113 sends a message to ATM/security manager 143, ATM app 135, and/or security agent 136. This causes any transaction that may have been in progress to be aborted, any card inserted into card reader slot 132 to be confiscated (retained within a bin and not returned to the operator, and/or card tampering detection manager 113 may send an alert to security systems of governmental authority systems. This also places ATM 130 out of service until a service technician has been dispatched to ATM 130 and inspects card reader with card slot 132 for a card skimmer and/or a card skimmer.

In another approach, rather than card tampering detection manager 113 processing rules for the bounding boxes, images, identifiers (hands, arms, known objects, unknown objects), calculated distances, calculated elapsed times, and transaction events are provided as input to a third MLM 114. The third MLM 114 returns a confidence percentage as to whether the operator is engaged in nefarious activity to install a skimmer or shimmer within card slot 132. Card tampering detection manager 113 then compares the confidence percentage against a predefined threshold confidence percentage and initiates the message sending and/or alerts when the third MLM's outputted confidence percentage is at or above the threshold confidence percentage.

In still another approach, images taken by cameras 120 and 137 are monitored and tracked by agent 136 and/or detection manager 113 using a vision-tracking algorithm. The algorithm is trained to recognize and track arms, hands of the arms or hands with gloves on adjacent to the card slot 132. Bounding boxes in the images are placed around the hands or the gloves. Unexpected objects in the hands or gloves are also identified with bounding boxes within the images by extracting image features and comparing those extracted image features against model features associated with known objects. A card (such as a bankcard) is not an unexpected object. The algorithm also identifies hand gestures, such that when a hand gesture indicates a potential for fraudulent behavior along with an unexpected object (such as a skimmer or shimmer), agent 136 and/or card tampering detection manager 113 can trigger a variety of automated actions, such as and by way of example only, capturing a video clip corresponding to the activity at the ATM 130, sending the video clips for review to ATM/security manager 143, sending the video clip to a law enforcement agency for review and action, sending a message to ATM app 135 to halt the transaction on the ATM 130 and shut down the ATM 130, capturing an image of any bankcard used during the tracking by the hands (this may be used to open the card slot 132 to install or deinstall a skimmer or a shimmer of the thief), using Optical Character Recognition (OCR) on any card detected to identify a legitimate bank account or stolen bank account being used by the thief, and sending a message with the bank account to ATM/Security manager 143 to suspend any activity from that account until a full review is done, etc. Actions can be detected based on the hand gestures and/or unrecognized objects in the hands, such as an attempt to jam the card slot 132, installing a skimmer of a shimmer, etc. Agent 136 and/or detection manager 113 can receive identifiers for hand gestures and actions as flagged by the vision-tracking algorithm and score the gestures and actions, any score above a set threshold score value can be assumed to be a card slot tampering event and any of the above-noted automated actions can be processed through messages and notifications sent to the ATM app 135 and ATM/security manager 143.

In an embodiment, of the fourth image processing technique, an overhead camera 120 captures and tracks the hands of a person present at the ATM 130 as discussed above, frame tracking of the images indicate that the person never engages the ATM 130 (does not touch the touchscreen or keypad and does not have any bankcard) but the hands are near or adjacent to the card slot 132 for X amount of time. This could be indicative of a thief installing a skimmer/ shimmer or coming back to remove a previously installed skimmer/shimmer. In such situations, security agent 136 and/or cash trapping detection manager 113 sends an alert to ATM/security manager 143.

Again, just one of the above-mentioned image processing techniques can be deployed, a combination of the techniques employed, or all of the techniques employed for any given ATM 130.

In an embodiment, only card tampering detection manager 113 is deployed for one, some combination, or all of the image processing techniques. In this embodiment, only the images taken by one or more cameras 120 and/or 137 need to be accessible to cloud/server 110 in real time from a network-accessible storage location. No changes are required on the existing ATM 130 for system 100 to operate and detect card slot tampering and send notifications and messages to shut down the ATM 130.

In an embodiment, only security agent 136 is deployed for one, some combination, or all of the image processing techniques on the ATM 130. This can be done remotely and is only a software change on ATM 130 and does not require any hardware change on ATM 130.

In an embodiment, both card tampering detection manager 113 and security agent 136 are deployed. For example, security agent 136 may process an Application Programming Interface (API) to interact with card tampering detection manager 113, which permits card tampering detection manager 113 to relay instructions to ATM 135 to shut down the card slot 132 and/or shut down ATM 135 entirely. In another situation, card tampering detection manager 113 may process one or a subset of the image processing techniques discussed above independent of security agent 136 that processes one or a subset of the image processing techniques. Both the card tampering detection manager 113 and security agent 136 can each independently detect a card tampering event and shut down card slot 132 and/or notify ATM/security manager 143. In still another situation both card tampering detection manager 113 and security agent 136 each independently process a same image processing technique or a same set of image processing techniques and compare results with one another for determining whether a card slot tampering event is to be raised and automated actions taken.

In an embodiment, card tampering detection manager 113 is processed on a local server 110 associated with ATM 130.

In an embodiment, card tampering detection manager 113 is processed on a cloud 110.

In an embodiment, only a single camera 120 or 137 is deployed with the system 100. In an embodiment, the single camera is overhead camera 120. In an embodiment, the single camera is integrated or affixed camera 137.

In an embodiment, more than one camera 120 or 137 is deployed with system 100. In an embodiment each of the more than one cameras are overhead cameras 120. In an embodiment each of the one or more cameras are integrated or affixed cameras 137. In an embodiment, at least one of the one or more cameras is an overhead camera 120 and at least one other of the one or more cameras is an integrated or affixed camera 137.

In an embodiment, one camera 120 and/or 137 is used to perform the card slot tampering detection and images obtained other cameras 120 and/or 137 are correlated via time stamps. Card tampering detection manager 113 then assembles the correlated video associated with a card slot tampering detection event into a video clip that is provided as a link for viewing with the messages and/or alerts sent to ATM/security manager 143, governmental authority systems, security systems, and/or security agent 136. The video clip may comprise an image of the operator's face or other distinguishing features of the operator that may prove use during investigation of the card slot tampering event.

In an embodiment, system 100 operates on any transaction terminal that comprises a card reader with card slot 132, such as Self-Service Terminals (SSTs) operated for self-checkouts and/or Point-Of-Sale (POS) terminals operated by cashiers of a retailer during customer-assisted checkouts. Thus, system 100 can comprises a plurality of different types of transaction terminals beyond just the ATM 130 illustrated in FIG. 1 of system 100.

In an embodiment, the ATM 130 comprises a microphone as one of the other modules and/or the cameras 120 and/or 130 comprise a microphone. The microphone can capture audio while the operator is at the ATM including noises related to use of tools and speech of the operator. Predefined keywords may be listened for such as "hurry up get it in there," we are going to get caught," "skimmer," "shimmer," etc. An audio clip may be captured of the noises and/or speech and included with the alter or notification and included within any link to an audio clip.

In an embodiment, at least one camera 120 and/or 130 captures visual features of the individual (operator), such as facial features, body features, eye features, etc. The facial or body features are provided with the video clip and with the alert or the notification. This information can be used to comparison against other events associated with other ATMs 130 where skimmers and/or shimmers were installed.

In an embodiment, the hand actions monitored may be respect to other modules 133 may be tracked and monitored beyond just the card reader 132. For example, actions and activities with respect to the ATM's Personal Identification Number (PIN) pad. Any available camera 137 affixed to the modules 133 can be used when evaluating the images for objects in the hands and hand actions of the user. Any other module 133 associated with these hand actions or objects may also be identified in the alert or the notification, such that a service technician can perform tests on such modules to ensure they have not been tampered with by the individua/ operator.

In an embodiment, wireless transceivers (types of other modules 133) may be activated to scan for wireless devices in possession of the individua/operator at the ATM 130. The transceivers can scan for wireless device identifiers that are within wireless range of the transceivers, and the device identifiers may be recorded for purposes of linking a device of the individual to other past skimmer/shimmer attacks or for purposes of allowing law enforcement to track the location of the mobile device in possession of the individual. The device identifier of the individual/operator may be sent with the alert or the notification.

One now appreciates how card slot tampering detection can be performed using existing camera infrastructures of ATMs 130 without deploying costly hardware modifications to card readers with card slots 132 or any other modules 133 of the ATMs 130. Card slot tampering can be detected in real time and halted, and the proper resources notified. In some cases, images of a face of the thief/operator and account information (via card image capture and OCR) for the thief can be captured from the images and relayed to the appropriate entities (financial institutions and legal authorities for further investigations).

These embodiments and other embodiments are now discussed with reference to the FIGS. 2-3.

Figure 2:
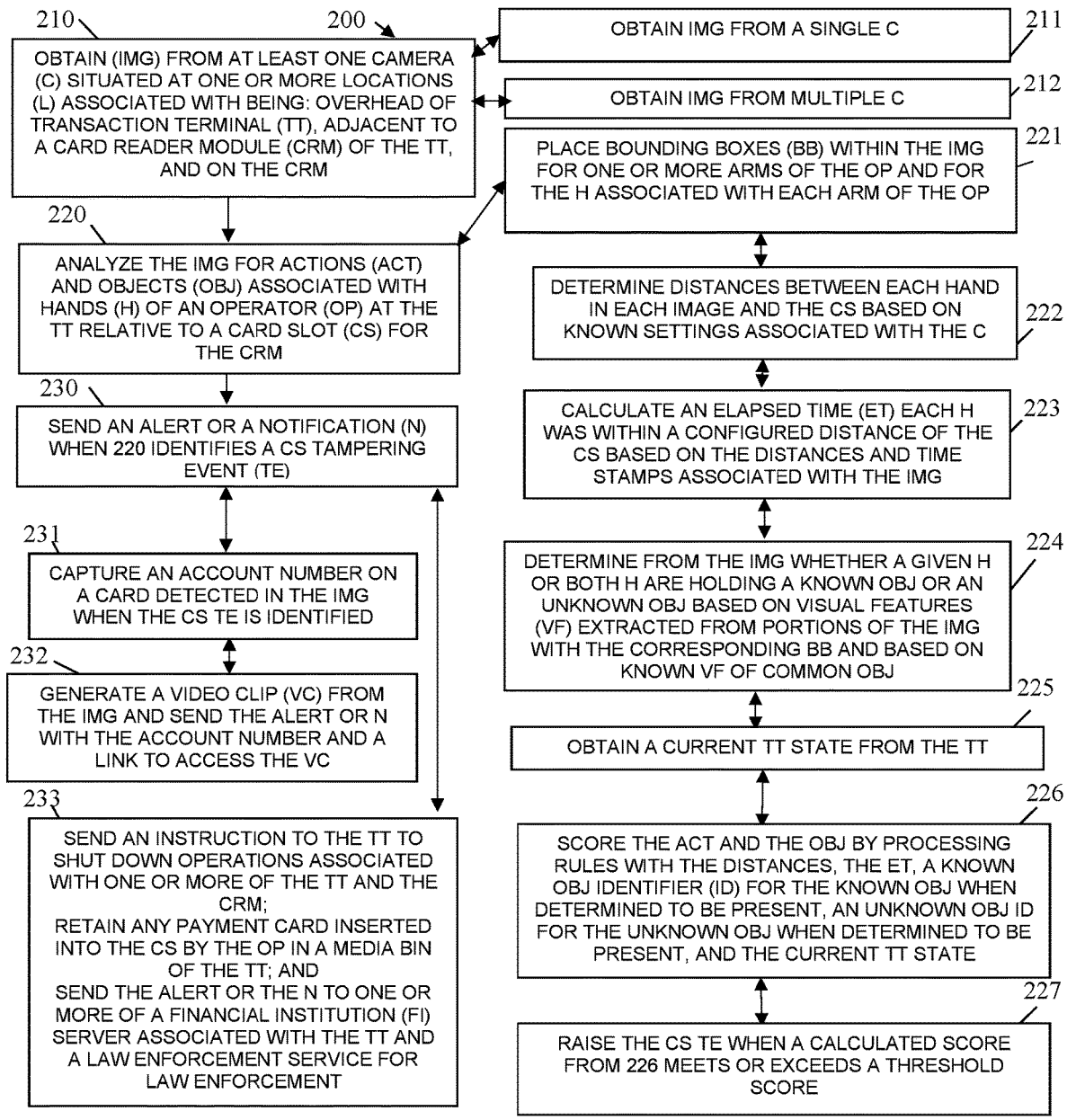
FIG. 2 is a diagram of a method for hand action tracking for card slot tampering, according to an example embodiment.

FIG. 2 is a diagram of a method 200 for hand action tracking for card slot tampering, according to an example embodiment. The software module(s) that implements the method 200 is referred to as a "card slot tampering detection manager." The card slot tampering detection manager is implemented as executable instructions programmed and residing within memory and/or a non-transitory computer-readable (processor-readable) storage medium and executed by one or more processors of a device. The processor(s) of the device that executes the card slot tampering detection manager are specifically configured and programmed to process the card slot tampering detection manager. The card slot tampering detection manager has access to one or more network connections during its processing. The network connections can be wired, wireless, or a combination of wired and wireless.

In an embodiment, the card slot tampering detection manager executes on cloud 110. In an embodiment, the card slot tampering detection manager executes on server 110.

In an embodiment, the card slot tampering detection manager executes on ATM 130.

In an embodiment, a portion of the card slot tampering detection manager executes on cloud/server 110 and another portion of the card slot tampering detection manager executes on ATM 130.

In an embodiment, the card slot tampering detection manager is one, all, or any combination of or both of 113, 114, and/or 136.

At 210, the card slot tampering detection manager obtains images from at least one camera 120 and/or 137 situated at one or more locations associated with being overhead of a transaction terminal 130, adjacent to a card reader module 132 of the transaction terminal 130, and on the card reader module 132.

In an embodiment, at 211, the card slot tampering detection manager obtains the images from a single camera 120 or 137.

In an embodiment, at 212, the card slot tampering detection manager obtains the images from multiple cameras 120 and 137.

At 220, the card slot tampering detection manager analyzes the image for action and objects associated with hands of an operator at the transaction terminal 130 relative to a card slot for the card reader module 132.

In an embodiment, at 221, the card slot tampering detection manager places bounding boxes within the images for one or more arms of the operator and for the hand associated with each arm of the operator.

In an embodiment of 221 and at 222, the card slot tampering detection manager determines distances between each hand in each image and the card slot of the card reader module 132 based on known settings associated with the camera(s) 120 and/or 137.

In an embodiment of 222 and at 223, the card slot tampering detection manager calculates an elapsed time each hand was within a preconfigured distance of the card slot for the card reader module 132 based on the distances and time stamps associated with the images. For example, a user's hand was touching or nearly touching the card slot for over 10 seconds.

In an embodiment of 223 and at 224, the card slot tampering detection manager determines from the images whether a given hand or both hands are holding a known object, or an unknown object based on visual features extracted from portions of the images with the corresponding bounding boxes and based on known visual features of known common objects. For example, a wallet or a card is a known object for which known visual features are associated; conversely, a screw driver or a small skimmer of shimmer is unknown and lacks features such that it is assigned an unknown object identifier.

In an embodiment of 224 and at 225, the card slot tampering detection manager obtains a current transaction terminal state from the transaction terminal 130. For example, a transaction is in progress, a transaction is not in progress, a transaction in progress is associated with a transaction type of withdrawal, deposit, transfer, balance inquiry, etc.

In an embodiment of 225 and at 226, the card slot tampering detection manager scores the actions of the hands and the objects by processing rules with the distances, the elapsed times, a known object identifier for the known object when determined to be present at 224, an unknown object identifier for the unknown object when determined to be present at 224, and the current transaction terminal state.

At 230, the card slot tampering detection manager sends an alert or a notification when 220 identifies a card slot tampering event.

In an embodiment, at 231, the card slot tampering detection manager captures an account number on a card detected in the images when the card slot tampering event is identified at 220. The image features can be assigned to known identifier associated with a payment card, and the pixels of the image can be OCR'd to acquire the account number.

In an embodiment of 231 and at 232, the card slot tampering detection manager generates a video clip from the images and sends the alert of the notification with the account number and a link to access the video clip.

In an embodiment, at 233, the card slot tampering detection manager performs one or more actions with 230 comprising 1) sending an instruction to the transaction terminal 130 to shut down operations associated with the transaction terminal 130 as a whole and the card reader module 132; 2) retaining any payment card inserted into the card slot of the card reader module 132 by the operator in a media bin (preventing recovery by the operator of the operator-supplied card); and/or 3) sending the alert or the notification to one or more of a FI server associated with the transaction terminal 130 and a law enforcement service for law enforcement.

Figure 3:
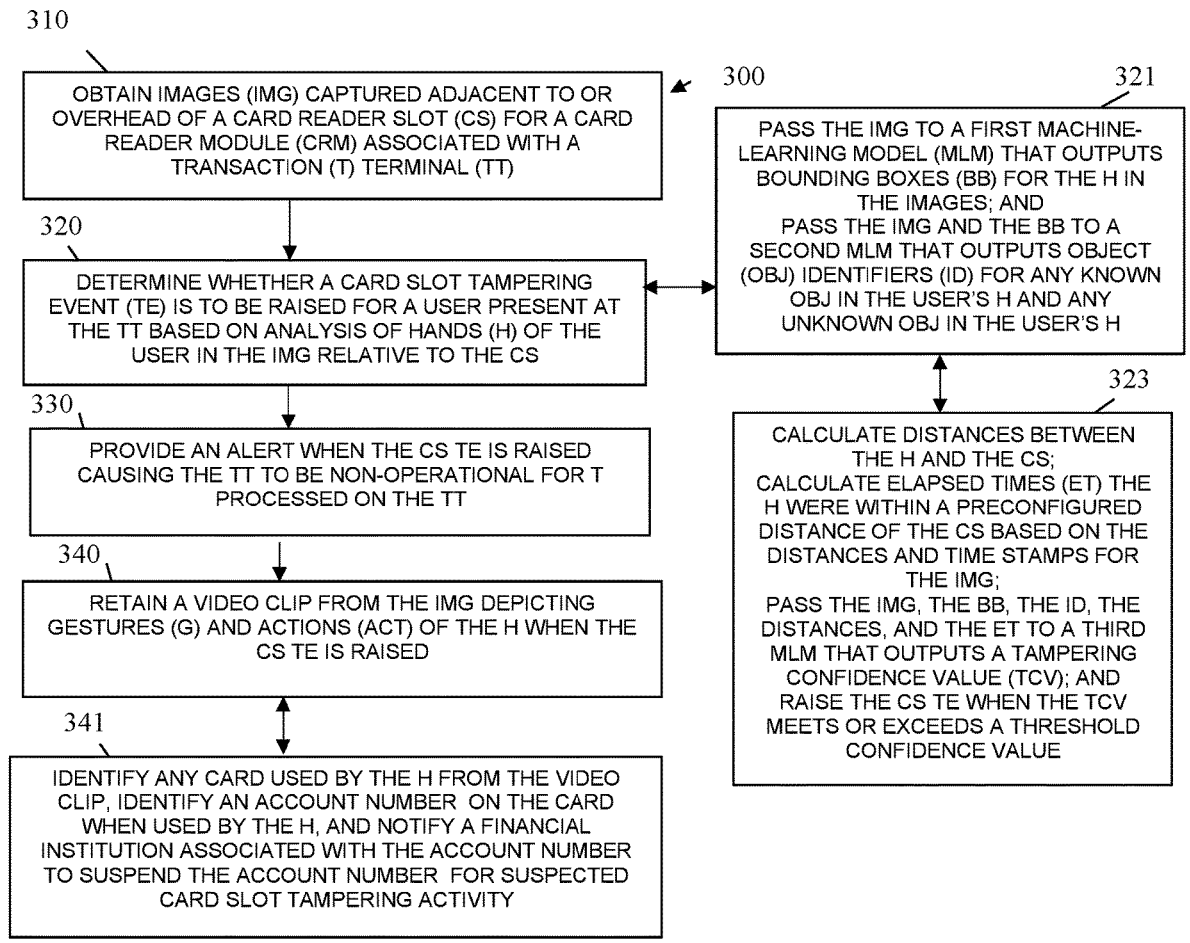
FIG. 3 is a diagram of another method for hand action tracking for card slot tampering, according to an example embodiment.

FIG. 3 is a diagram of another method 300 for hand action tracking for card slot tampering, according to an example embodiment. The software module(s) that implements the method 200 is referred to as a "hand-based card slot tampering manager" The hand-based card slot tampering manager is implemented as executable instructions programmed and residing within memory and/or a non-transitory computer-readable (processor-readable) storage medium and executed by one or more processors of a device. The processor(s) of the device that executes the hand-based card slot tampering manager are specifically configured and programmed to process the hand-based card slot tampering manager. The hand-based card slot tampering manager has access to one or more network connections during its processing. The network connections can be wired, wireless, or a combination of wired and wireless.

In an embodiment, the device that executes the hand-based card slot tampering manager is cloud 110. In an embodiment, the device that executes the hand-based card slot tampering manager is server 110.

In an embodiment, the device that executes the hand-based card slot tampering manager is ATM 130.

In an embodiment a portion of the i hand-based card slot tampering manager executes on cloud/server 110 and another portion of the hand-based card slot tampering manager executes on ATM 130.

In an embodiment, the hand-based card slot tampering manager is one of, some combination of, or all of 113, 114, 136, and/or method 200.

The hand-based card slot tampering manager presents another and, in some ways, enhanced processing perspective from that which was discussed above with method 200 of FIG. 2.

At 310, the hand-based card slot tampering manager obtains images captured adjacent to or overhead of a card reader slot for a card reader module 132 associated with a transaction terminal 130.

At 320, the hand-based card slot tampering manager determines whether a card slot tampering event is to be raised for a user present at the transaction terminal 130 based on analysis of hands of the user in the images relative to the card slot of the card reader module 132.

In an embodiment, at 321, the hand-based card slot tampering manager passes the images to a first MLM 114, which outputs bounding boxes placed around arms and hands of the user within the images. The hand-based card slot tampering manager then passes the images with the bounding boxes to a second MLM 114, which outputs object identifiers for any known object in the user's hand and any unknown object in the user's hand.

In an embodiment of 321 and at 322, the hand-based card slot tampering manager calculates distances between the hands and the card slot and calculates elapsed times the hands were within a preconfigured distance of the card slot based on the distances and time stamps for the images. The hand-based card slot tampering manager passes the images, the bounding boxes, the object identifiers (known and/or unknown), the distances, and the elapsed times as input to a third MLM 114, which outputs a tampering confidence value. The hand-based card slot tampering manager raises the card slot tampering event when the tampering confidence value meets or exceeds a threshold confidence value.

At 330, the hand-based card slot tampering manager provides an alert when the card slot tampering event is raised causing the transaction terminal 130 to be non-operational for transactions processed on the transaction terminal 130.

In an embodiment, at 340, the hand-based card slot tampering manager retains a video clip from the images depicting gestures and actions of the hands when the card slot tampering event is raised.

In an embodiment of 340 and at 341, the hand-based card slot tampering manager identifies any payment card used by the hands from the video clip, identifies an account number on the payment card when used by the hands from the video clip, and notifies a FI associated with the account number to suspend the account number for suspected card slot tampering activity.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining images captured from at least one camera situated at one or more locations associated with being: overhead of a transaction terminal, adjacent to a card reader module of the transaction terminal, and on the card reader module;
analyzing the images for actions and objects associated with hands of an operator at the terminal relative to a card slot for the card reader module; and
sending an alert or a notification when the analyzing identifies a card slot tampering event wherein sending further includes capturing an account number on a card detected in images when the card slot tampering event is identified by the analyzing, wherein capturing further includes generating a video clip from the images and sending the alert or notification with the account number and a link to access the video clip.

2. The method of claim 1, wherein obtaining further includes obtaining the images from a single camera.

3. The method of claim 1, wherein obtaining further includes obtaining the images from multiple cameras.

4. The method of claim 1, wherein analyzing further includes placing bounding boxes within the images for each arm and hand of the operator.

5. The method of claim 4, wherein placing further includes determining a distance between a corresponding hand in each image and the card slot based on known settings associated with the at least one camera.

6. The method of claim 5, wherein determining further includes calculating an elapsed time the corresponding hand was within a configured distance of the card slot based on a corresponding determined distance and corresponding time stamps associated with the images.

7. The method of claim 6, wherein calculating further includes determining from the images whether a given hand or both hands are holding a known object, or an unknown object based on visual features extracted from portions of the images associated with the corresponding bounding boxes and based on known visual features for common objects.

8. The method of claim 7, wherein determining further includes obtaining a current transaction terminal state from the transaction terminal.

9. The method of claim 8, wherein obtaining the current transaction terminal state further includes scoring the actions and the objects by processing rules with the distances, the elapsed times, a known object identifier for the known object when determined to be present, an unknown object identifier for the unknown object when determined to be present, and the current transaction terminal state.

10. The method of claim 9, wherein scoring further includes raising the card slot tampering event when a calculated score for the scoring meets or exceeds a threshold score.

11. The method of claim 1, wherein sending further includes one or more of:
   sending an instruction to the transaction terminal to shut down operations associated with one or more of the transaction terminal and the card reader module;
   retaining any payment card inserted into the card slot by the operator in a media bin of the transaction terminal; and
   sending the alert or the notification to one or more of a financial institution server for a financial institution associated with the transaction terminal and a law enforcement service for law enforcement.

12. A method, comprising:
   obtaining images captured adjacent to or overhead of a card reader slot for a card reader module associated with a transaction terminal;
   determining whether a card slot tampering event is to be raised for a user present at the transaction terminal based on analysis of hands of the user in the images relative to the card reader slot;
   providing an alert when the card slot tampering event is raised causing the transaction terminal to be non-operational for transactions processed on the transaction terminal; and
   retaining a video clip from the images depicting gestures and actions of the hands when the card slot tampering event is raised, wherein retaining further includes identifying any card used by the hands from the video clip, identifying an account number on the card when used by the hands, and notifying a financial institution associated with the account number to suspend the account number for suspected card slot tampering activity.

13. A method, comprising:
   obtaining images captured adjacent to or overhead of a card reader slot for a card reader module associated with a transaction terminal;
   determining whether a card slot tampering event is to be raised for a user present at the transaction terminal based on analysis of hands of the user in the images relative to the card reader slot; and
   providing an alert when the card slot tampering event is raised causing the transaction terminal to be non-operational for transactions processed on the transaction terminal;
   wherein determining further includes passing the images to a first Machine-Learning Model (MLM) that outputs bounding boxes for the hands in the images and passing the images and the bounding boxes to a second MLM that outputs object identifiers for any known object in the user's hands and any unknown object in the user's hands.

14. The method of claim 13, wherein passing further includes calculating distances between the hands and the card reader slot, calculating elapsed times the hands were within a preconfigured distance of the card reader slot based on the distances and time stamps for the images, passing the images, the bounding boxes, the identifiers, the distances, and the elapsed times to a third MLM that outputs a tampering confidence value, and raising the card slot tampering event when the tampering confidence value meets or exceeds a threshold confidence value.

* * * * *